Sept. 30, 1958 S. STEINITZ 2,854,620
POWER REGULATING SYSTEM
Filed July 6, 1953 2 Sheets-Sheet 1

INVENTOR.
STEPHAN STEINITZ
BY
ATTORNEY

Sept. 30, 1958 S. STEINITZ 2,854,620
POWER REGULATING SYSTEM
Filed July 6, 1953 2 Sheets-Sheet 2

INVENTOR.
STEPHAN STEINITZ
BY *Clement J Paynokas*
ATTORNEY

United States Patent Office 2,854,620
Patented Sept. 30, 1958

2,854,620

POWER REGULATING SYSTEM

Stephan Steinitz, St. Louis, Mo., assignor to Vickers Incorporated, Detroit, Mich., a corporation of Michigan Application July 6, 1953, Serial No. 366,181

16 Claims. (Cl. 323—66)

This invention relates to power transmission and more particularly to electrical control systems.

In electric arc welding systems it is desirable to have a contact or short circuit current value higher than the normal welding current to ensure a speedy development of the arc upon initial contact. However, as soon as the arc is developed the current must be immediately restricted to the normal welding current, which should then be held substantially constant through a reasonable voltage range to promote a uniform good quality weld.

In accordance with one embodiment of the invention the above desirable characteristics are obtained in a reactor controlled electric arc welder by means of a feedback network which in response to a voltage dependent upon a condition of the welding circuit will, upon the initial striking of the arc, provide negative feedback to the reactor and when the arc voltage rises to a certain value will provide positive feedback to the reactor. Although the reactor control circuit of the present invention finds special utility in an electric arc welder system, it is not limited to such use, nor is it limited to the particular sequence of feedbacks noted above.

It is therefore an object of this invention to provide a new and improved reactor controlled electric arc welder.

Another object of the invention is to provide a feedback network in a reactor controlled arc welder which network, in response to a single variable voltage source dependent upon the arc condition, will up to a certain voltage provide negative feedback to the reactor and beyond that voltage supply positive feedback to the reactor.

A further object of the invention is to provide a reactor control system wherein a network provides various permutations of feedback to the reactor in response to a variable signal supplied from the output and applied to the network.

Still another object is to devise a reactor control system wherein a network supplies various permutations of control M. M. F.'s to the reactor in response to a variable voltage applied to the network.

Further objects and advantages of the present invention will be apparent from the following description, reference being had to the accompanying drawings wherein a preferred form of the present invention is clearly shown.

Figure 1:
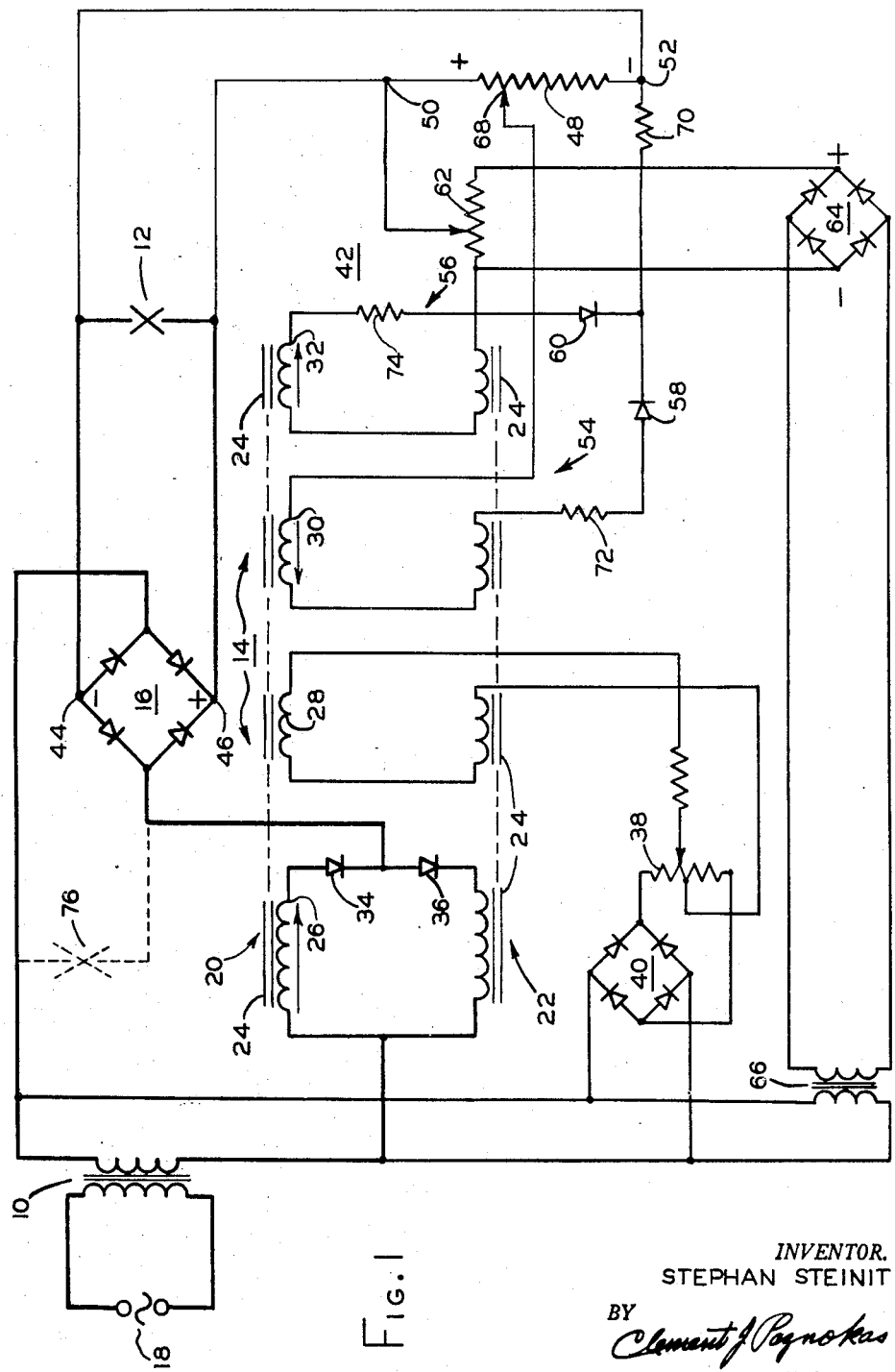
Fig. 1 is a diagram illustrating the invention as embodied in an electric arc welder.

Referring now to Fig. 1, the circuit therein includes a power transformer 10 for supplying welding current to welding arc 12 through a magnetic amplifier 14 and a rectifier 16. The primary of the transformer 10 is connected to a source of alternating current 18, while the secondary is connected to the input of rectifier 16 through the magnetic amplifier 14, the output of the rectifier 16 being connected to the arc load 12. Current supplied to the welding arc 12 is controlled by the magnetic saturation level of the reactors in the magnetic amplifier 14.

Any suitable magnetic amplifier which can be driven up or down depending on the sense of the control M. M. F.'s may be employed. The particular magnetic amplifier indicated at 14 is the well-known self-saturating doubler circuit. Although a single core reactor may be used, two reactors 20 and 22 are illustrated as forming the magnetic amplifier 14. Each reactor is provided with a saturable magnetic core 24 carrying a reactance winding 26, a bias winding 28 and a pair of control windings 30 and 32.

The reactance winding 26 of reactor 20, together with a series half-wave rectifier 34, is connected in parallel with the reactance winding of the reactor 22 in series with rectifier 36. A junction between the two reactance windings is connected to one side of the secondary of transformer 10, while the other side of the secondary is connected to an input terminal of rectifier 16, the other input terminal of rectifier 16 being connected to rectifiers 34 and 36, the latter rectifiers being oppositely related with respect to each other to allow the magnetic amplifier to furnish alternating current to rectifier 16.

Figure 2:
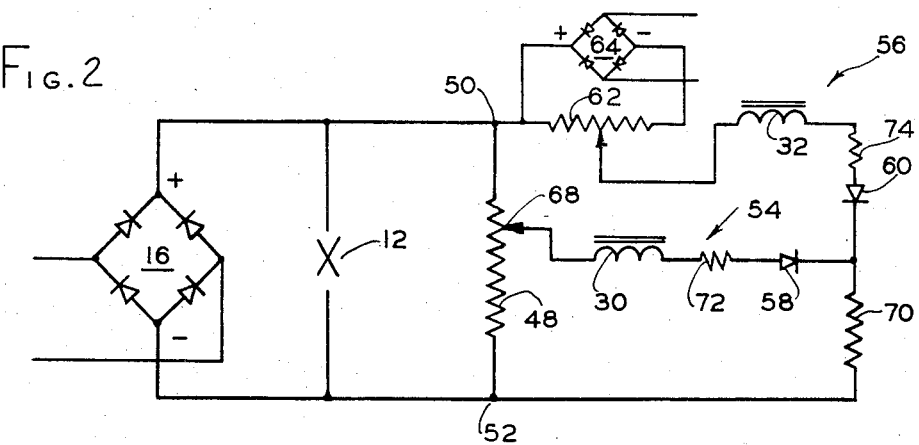
Fig. 2 is a diagram of the feedback network shown in Fig. 1 geometrically rearranged but electrically unchanged.

Current for the bias windings 28 is provided by a suitable source, for example, a voltage divider 38, connected across the output of a rectifier 40 coupled to the transformer 10. The control windings 30 and 32 are connected in a feedback network 42, which network is more openly illustrated in Fig. 2 and is connected across the output of the rectifier 16 indicated at points 44 and 46, to receive a signal or voltage dependent on the voltage across the welding arc.

In the feedback network 42 a voltage divider 48 has outer terminals 50 and 52 connected to the output terminals 44 and 46 of the rectifier 16 to receive the voltage proportional to the arc voltage. The feedback network also includes two parallel branches 54 and 56. Branch 54 has connected therein the control winding 30 with a series rectifier 58, while the branch 56 includes the control winding 32 with a series rectifier 60 and a source of bucking voltage which may be, for example, a voltage divider 62 across the output of a rectifier 64 supplied through transformers 66 and 10.

One end of branch 54 is connected to an adjustable intermediate tap 68 on the voltage divider 48. One end of branch 56 is connected to the outer terminal 50 of the voltage divider. The other ends of branches 54 and 56 are connected to the other outer terminal 52 of the voltage divider 48 through an impedance 70.

Because the voltage of source 62 is poled to oppose the signal voltage applied across the voltage divider 48 by the welder output, it is conveniently referred to as a bucking voltage.

The control windings 30 and 32 are so related and connected that they produce oppositely related magnetic effects in the reactor when current flows through the respective branches 54 and 56 in the conducting direction of their respective rectifiers 58 and 60. In the specific example shown, control winding 30 is a negative feedback winding, that is, it tends to desaturate the reactor and drive the output of the amplifier downward. Control winding 32, on the other hand, is a positive feedback winding in that when current flows through branch 56 the M. M. F.'s of the winding 32 will aid the self-saturating M. M. F. of the magnetic amplifier and therefore tend to drive the amplifier output upward. Rectifier 58 will not allow current to flow through coil 30 in a direction that would produce M. M. F.'s tending to drive the amplifier upward, while rectifier 60 is poled to block the flow of current through winding 32 which would tend to drive the amplifier downward. The relationship of the M. M. F.'s produced by the different windings is indicated in Fig. 1 by the arrows alongside the respective windings. It will be noted that rectifiers 58 and 60 are similarly related, that is, they are poled in the same direction with respect to the signal voltage or to a common point, for example the terminal 52.

It will be apparent from the circuit drawings that the branch containing the control winding 32, in this particular case the positive feedback winding, is connected to a point of higher potential 50 on the voltage divider 48. On the other hand, the branch including winding 30 is connected to a point 68 of lower potential on the voltage divider 48. The potential difference between the points 50 and 68 of the voltage divider 48 to which the respective branches 54 and 56 are connected may be, for example, of the order of ten to twenty-five percent of the total signal voltage applied to the voltage divider, and for convenience this difference shall be referred to as the "difference" voltage.

Although branch 56 is connected to a point of higher potential on the voltage divider the portion of the signal voltage impressed on branch 56 is opposed by the bucking voltage at 62. Therefore, for small arc voltages the smaller part of the arc voltage acting on branch 54 will drive current through the rectifier 58 and the winding 30, thus providing negative feedback to the amplifier as illustrated by section F of the resultant feedback curve in Fig. 3. With rising arc voltage the difference voltage rises proportionately. When the latter becomes substantially equal or slightly higher than the bucking voltage at 62, current conduction transfers from branch 54 to branch 56 and continues to flow there for all higher arc voltages while a voltage in the blocking direction is impressed on rectifier 58 of branch 54. Thus, as the arc voltage rises the resultant feedback applied to the magnetic amplifier shifts from negative feedback to positive feedback, an example of the latter being illustrated by section G of the resultant feedback curve in Fig. 3.

The resultant feedback curve delineated by sections F, H and G is theoretical and assumes negligible resistance in the windings 30 and 32 and in the rectifiers 58 and 60, and further that there is no regulation in the signal voltage divider and the bucking voltage divider. The vertical section H or transfer point from negative to positive feedback in the resultant feedback curve occurs at the point where the differential and bucking voltage are equal. For both the negative and positive branches the slope of the feedback characteristic in amperes is determined by the current limiting resistor 70 in the common part of the feedback network. By providing different numbers of turns in the respective windings 30 and 32, the ratio between the effects of the positive and negative feedback applied by windings may be modified.

Figure 3:
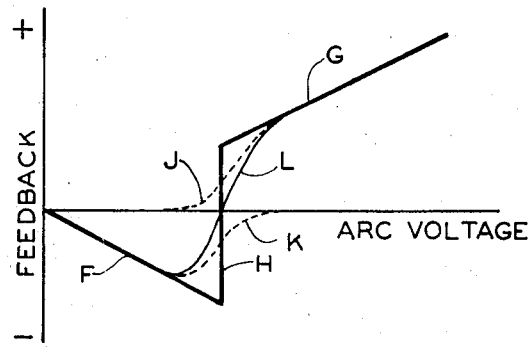
Fig. 3 is a chart with curves illustrating an example of feedback control obtainable by the circuit of Fig. 2.

In actual practice the resistance of the windings 30 and 32 and of the rectifiers 58 and 60, etc., will cause the transition from negative to positive feedback in the magnetic amplifier to spread over a band of voltage values instead of the definite vertical section H in Fig. 3. The dotted curve lines J—K in Fig. 3 show the individual overlapping curves of the respective feedback circuits, while the light line L illustrates the equivalent resultant, indicating how resistance in circuit has the effect of smoothing the transfer from feedback of one sense to feedback of the opposite sense. The equivalent resistance of the various circuit elements in the respective branches together with any additional resistance which may be deliberately inserted in the branches if desired is indicated at 72 and 74.

Figure 4:
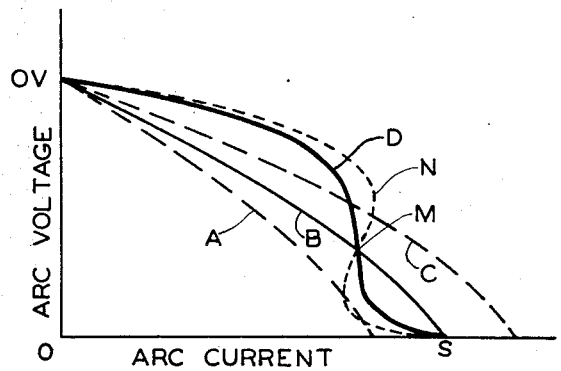
Fig. 4 is a chart comparing the control characteristic obtainable by the circuit of Fig. 1 as compared to the output characteristic of the circuit in Fig. 1.

Depending on the magnetization or saturation level of the magnetic amplifier resulting from the self-saturation of the magnetic amplifier and the effects of the bias winding 28, the volt-ampere output characteristic of the welder, without feedback, may be characterized by curves A, B and C in Fig. 4, wherein OV is open circuit voltage and S is short circuit voltage. Curve B, for example, may be the volt-ampere characteristic at a particular pre-magnetization level while curves A and C may be the characteristics for lower and higher pre-magnetization values respectively. Aside from the fixed parameters of the various circuit components the pre-magnetization may be adjusted by adjusting the bias current. An example of the effect of the feedback system on the volt-ampere welding characteristic is illustrated by curve D (Fig. 4) which shows one example of the feedback effect on a welder having the original volt-ampere characteristic of curve B.

With the feedback network in operation, the short circuit point is not changed. When the arc voltage rises after short circuit, the saturation level, and thus the output of the amplifier, is at first decreased by negative feedback. At the point of feedback transition, a point M on the original curve B is passed, and for all higher arc voltages curve D lies to the right of curve B in the field of higher saturation levels of the magnetic amplifier. Variations in the curve D may be made by choosing suitable circuit values, for example, by varying the number of turns on the windings 30 and 32.

For example, curve D can be made to include a vertical section, or sections having both negative and positive slope as shown by the dotted line N.

The signal voltage at which the feedback transition takes place may be changed by adjusting either the bucking voltage value at 62 or the differential voltage at 68. For any given transition point the larger the differential voltage, the greater will be the bucking voltage required.

From 12 to 40 volts is an example of an arc welding voltage range. Suppose it is desired to make the transition point somewhere from 10–15 volts. If the tap 68 is set to provide a differential voltage of twenty percent, the bucking voltage should be approximately equal to this amount at the transfer point. Since the full arc voltage is across the voltage divider in the illustrated examples of the invention, the differential voltage at the desired transfer point would be twenty percent of the arc voltage of 10–15 volts and the bucking voltage required would then be from 2 to 3 volts.

Adding resistance in the respective branches 54 and 56 or increasing the resistance of resistor 70 has the effect of reducing the individual feedback slopes. A transfer of resistance from resistor 70 to the parallel branches 54 and 56 in such manner as to maintain the slopes of the individual branch currents unchanged will widen the overlap range of the respective feedback curves. Actually, if the ratio of the branch resistance to the resistor 70 is made very high, for example if resistor 70 is reduced to zero resistance, then the overlap may be extended to infinity. By manipulating these values the resultant feedback can be made to start in one sense with a rising signal voltage, and then either level off in the same sense or shift to the opposite sense at any desired slope.

Although the present invention has been described in connection with the D. C. arc load 12, the invention will function equally well, and in the same manner, in the case of an A. C. arc load which may be connected, for example at 76. Thus, the D. C. arc welder illustrated may be easily converted to an A. C. welder of substantially the same characteristics by simply switching the electrode and work cables from the D. C. side to the A. C. side. If A. C. welding only is desired, the rectifier 16 may be substantially smaller. In such case the signal voltage to the feedback network is still proportional to arc voltage although it is reduced by the rectifier drop.

In any particular magnetic amplifier application where it is desired to provide first a positive feedback and then a negative feedback upon a rise in signal voltage applied to the feedback network, the windings 30 and 32 may be electrically reversed to provide the desired effect. With these windings reversed branch 54 will supply positive feedback and branch 56 will provide negative feedback to the magnetic amplifier.

The use of the invention may be extended to afford more successive feedback permutations by adding more branches similar to branch 56 to points on the voltage divider 48 with values of bucking voltages in the added branch or branches chosen to give the desired effects. Effects such as successive changes from negative to positive and back to negative feedback on a continued rise in signal voltage may be obtained with the added branches.

While the form of embodiment of the invention as herein disclosed constitutes a preferred form, it is to be understood that other forms might be adopted, all coming within the scope of the claims which follow.

What is claimed is as follows:

1. A control system for a saturable core reactor whose output may be increased or decreased depending on the sense of control M. M. F.'s supplied to the reactor core, said system comprising means connectable to a source of variable signals for obtaining first, second and third potential points from a variable signal, the points being of progressively higher potential in the order named and having potential differences respectively between the first and second points, between the second and third points, and between the first and third points, a first branch connected to said first and third points, a second branch connected to said first and second points, said first branch comprising means for inserting therein a bucking voltage with respect to the potential difference between the second and third points, a one-way electric valve and means for applying a control M. M. F. of one sense to said reactor when current flows in said first branch, said second branch comprising a second one-way electric valve and means for applying control M. M. F.'s in the opposite sense to said reactor when current flows in said second branch, said second branch being adapted to have current flow therethrough when said potential difference between the second and third points is lower than the bucking voltage, said first branch being adapted to have current flow therethrough only when said potential difference exceeds said bucking voltage.

2. A control system for a reactor circuit wherein a saturable core reactor controls the power supplied to a variable load circuit and wherein the output of the reactor may be increased or decreased depending on the sense of control M. M. F.'s supplied to the reactor core, said system comprising means for obtaining first, second and third potential points from a signal derived from the load circuit, the points being of increasing potential in the order named and having potential differences respectively between the first and second points, between the second and third points, and between the first and third points, a first branch connected to said first and third points, a second branch connected to said first and second points, said first branch comprising means for inserting therein a bucking voltage with respect to the potential difference between the second and third points, a one-way electric valve and means for applying a control M. M. F. of one sense to said reactor when current flows in said first branch, said second branch comprising a second one-way electric valve and means for applying control M. M. F.'s in the opposite sense to said reactor when current flows in said second branch, said second branch being adapted to have current flow therethrough when the potential difference between the second and third points is lower than said bucking voltage, said first branch being adapted to have current flow therethrough only when said potential difference exceeds said bucking voltage.

3. A control system for a reactor circuit wherein a saturable core reactor controls the power supplied to a variable load circuit and wherein the output of the reactor may be increased or decreased depending on the sense of control M. M. F.'s supplied to the reactor core, said system comprising means for obtaining first, second and third potential points from a signal derived from the load circuit, the points being of increasing potential in the order named and having potential differences respectively between the first and second points, between the second and third points, and between the first and third points, an impedance, a first branch connected to said third point and through said impedance to the first point, a second branch connected to said second point and through said impedance to the first point, said first branch comprising means for inserting therein a bucking voltage with respect to the potential difference between the second and third points, a one-way electric valve and means for applying a control M. M. F of one sense to said reactor when current flows in said first branch, said second branch comprising a second one-way electric valve and means for applying control M. M. F.'s in the opposite sense to said reactor when current flows in said second branch, said second branch being adapted to have current flow therethrough when the potential difference between the second and third points is lower than said bucking voltage, said first branch being adapted to have current flow therethrough only when said potential difference exceeds said bucking voltage.

4. A system for controlling the power supplied to a negative resistance load, said system comprising a load circuit, a source of power for supplying power to said load circuit, a magnetic amplifier for controlling the power supplied from said source to said load circuit, said amplifier including a saturable core reactor whose output may be increased or decreased depending on the sense of control M. M. F.'s supplied to the reactor core, means for deriving a signal from said load circuit responsive to electrical variations of said load, means for obtaining first, second and third potential points from said signal, the points being of increasing potential in the order named and having potential differences respectively between the first and second points, between the second and third points, and between the first and third points, a first branch connected to said first and third points, a second branch connected to said first and second points, said first branch comprising means for inserting therein a bucking voltage with respect to the potential difference between the second and third points, a one-way electric valve and means for applying a control M. M. F. to said reactor tending to increase the current to the load when current flows in said first branch, said second branch comprising a second one-way electric valve and means for applying control M. M. F.'s in the opposite sense to said reactor when current flows in said second branch, said second branch being adapted to have current flow therethrough when the potential difference between the second and third points is lower than said bucking voltage, said first branch being adapted to have current flow therethrough only when said potential difference exceeds said bucking voltage.

5. A system for controlling the power supplied to a negative resistance load, said system comprising a load circuit, a source of power for supplying power to said load circuit, a magnetic amplifier for controlling the power supplied from said source to said load circuit, said amplifier including a saturable core reactor whose output may be increased or decreased depending on the sense of control M. M. F.'s supplied to the reactor core, means for deriving a siignal from said load circuit responsive to electrical variations of said load, means for obtaining first, second and third potential points from said signal, the points being of increasing potential in the order named and having potential differences respectively between the first and second points, between the second and third points, and between the first and third points, an impedance, a first branch connected to said third point and through said impedance to the first point, a second branch connected to said second point and through said impedance to the first point, said first branch comprising means for inserting therein a bucking voltage with respect to the potential difference between the second and third points, a one-way electric valve and means for applying a control M. M. F. to said reactor tending to increase the current to the load when current flows in said first branch, said second branch comprising a second one-way electric valve and means for applying control M. M. F.'s in the opposite sense to said reactor when current flows in said second branch, said second branch being adapted to have current flow therethrough when the potential difference between the second and third points is lower than said bucking voltage, said first branch being adapted to have current flow therethrough only when said potential difference exceeds said bucking voltage.

6. In a reactor system employing a saturable core reactor having control windings and whose output may be driven up or down depending on the sense of a control signal applied to the control windings, the combination therewith of a control network comprising first and second parallel branches, one branch comprising a one-way electric valve, means for supplying control M. M. F.'s to said reactor in response to current through that branch, and means for inserting a bucking voltage in that branch, the other branch comprising a second one-way electric valve and means for supplying control M. M. F.'s to said reactor in response to current through that branch, said branches having a common junction, said one-way valves being poled in the same direction with respect to said junction, and means connectable to a source of variable voltage signals for applying different proportions of a variable voltage signal to the respective branches, said bucking voltage being opposed to the signal voltage portion applied to said one branch, said branches being operable in response to said variable signal voltage to allow current flow in only said other branch below a predetermined signal value, and to allow current flow in said one branch above said predetermined value.

7. A magnetic amplifier circuit comprising a saturable core reactor having first and second control windings and a reactance winding for controlling power transfer from a supply source to a load, two parallel current paths, the first control winding being included in one of said paths, the second control winding being included in the other path, a one-way valve in each path, both valves being operable to conduct current forced by voltage of the same polarity, means for receiving a variable control voltage and for applying a fraction of said voltage to one of said paths and a fraction minus a constant value to the other path, said one path being operable to conduct current as the control voltage rises from zero and the other path being operable to conduct current only when said control voltage has a value such that the fraction applied to said other path exceeds said constant value, the respective control windings being operable to have oppositely related magnetic effects on said reactor.

8. A control circuit for a saturable core reactor having control windings and whose output may be driven up or down depending on the character of the current supplied to the control windings, said circuit comprising a voltage divider having end terminals for receiving a variable voltage and also having first and second taps and an intermediate tap between the first and second taps, first and second parallel branches, one end of the first branch being connected to the first tap, said first branch including a one-way valve, a source of bucking voltage operable to oppose current flow through said valve, and a first control winding on said reactor, one end of said second branch being connected to said intermediate tap, said second branch including a second one-way valve and a second control winding on said reactor, said valves being similarly poled with respect to said variable voltage, and means connecting the other ends of said branches to the second tap, said first and second windings tending to have opposite effects on said reactor when current flows through the respective branches.

9. A control circuit for a saturable core reactor having control windings and whose output may be driven up or down depending on the character of the current supplied to the control windings, said circuit comprising a voltage divider having end terminals for receiving a variable voltage and also having first and second taps and an intermediate tap between the first and second taps, first and second parallel branches, one end of the first branch being connected to the first tap, said first branch including a one-way valve, a source of bucking voltage operable to oppose current flow through said valve, and a first control winding on said reactor, one end of said second branch being connected to said intermediate tap, said second branch including a second one-way valve and a second control winding on said reactor, said valves being similarly poled with respect to said variable voltage, and means including an impedance connecting the other ends of said branches to the second tap, said first and second windings tending to have opposite effects on said reactor when current flows through the respective branches.

10. In a system for controlling current supplied to a load, the system having a saturable core reactor with a reactance winding connected to control current supplied to the load, the combination therewith of a feedback network comprising a voltage divider, means for applying across the voltage divider a voltage responsive to a condition of said load, a pair of parallel connected branches connected across said voltage divider, the respective branches being connected to different voltage points on the divider, one branch being connected to a higher voltage point than the voltage point to which the second branch is connected, said branches having a common circuit point, said one branch comprising a control winding on said reactor, a one-way electric valve, and means for inserting in said one branch a bucking voltage opposed to voltage of said voltage divider, said second branch comprising a second one-way electric valve and a control winding on said reactor, said valves being oriented in the same direction with respect to the common circuit point of said branches, said one branch being operable to supply feedback in one sense to said reactor, and the second branch being operable to supply feedback of the opposite sense to the reactor.

11. In an electric arc system wherein the arc current is controlled by a saturable core reactor, the combination therewith of a feedback network comprising a voltage divider, means for applying across the voltage divider a voltage proportional to the arc voltage, a pair of parallel connected branches connected across said voltage divider, the respective branches being connected to different voltage points on the divider, one branch being connected to a higher voltage point than the voltage point to which the second branch is connected, said branches having a common circuit point, said one branch comprising a control winding on said reactor, a one-way electric valve, and means for inserting in said one branch a bucking voltage opposed to voltage of said voltage divider, said second branch comprising a second one-way electric valve and a control winding on said reactor, said valves being oriented in the same direction with respect to the common circuit point of said branches, said one branch being operable to supply positive feedback to said reactor, and the second branch being operable to supply negative feedback to the reactor.

12. An apparatus for controlling the power supplied to a variable load, said apparatus comprising a source of power, a load circuit with a load, a magnetic amplifier for controlling the power supplied from said source to said load, said amplifier including a saturable core reactor having a reactance winding whose impedance may be decreased or increased depending on the sense of control M. M. F.'s supplied to the reactor, and a feedback network comprising a voltage divider, means for deriving from the load circuit a voltage proportional to electrical variations in the load, means for applying said derived voltage across said voltage divider, said voltage divider having first, second and third voltage points, the second having a potential higher than the first, and the third having a potential higher than the second, and first and second circuit paths having a common point, the first path comprising a first control winding on said reactor, a one-way electric valve, and a source of bucking voltage for opposing current flow through said valve, the second path comprising a second control winding on said reactor and a second one-way electric valve, said valves being poled in the same direction with respect to said common point, the first path being connected to the third voltage point on the divider and the second path being connected to the second voltage point on the divider, and means connecting said common point to said first voltage point on the divider, said first and second control windings being adapted to have oppositely related magnetic effects on said reactor.

13. Arc-welding apparatus comprising a source of power, a welding load circuit, a magnetic amplifier for controlling the power supplied from said source to said load circuit, said amplifier including a saturable core reactor whose impedance may be decreased or increased depending on the sense of control M. M. F.'s supplied thereto, and a feedback network comprising a voltage divider, means for deriving from the load circuit a voltage proportional to the voltage across the load, means for applying said derived voltage across said voltage divider, said voltage divider having first, second and third voltage points, the second having a potential higher than the first, and the third having a potential higher than the second, first and second circuit paths having a common point, the first path comprising a first control winding on said reactor, a one-way electric valve, and a source of bucking voltage for opposing current flow through said valve, the second path comprising a second control winding on said reactor and a second one-way electric valve, said valves being poled in the same direction with respect to said common points, the first path being connected to the third voltage point on the divider and the second path being connected to the second voltage point on the divider, and means connecting said common point to said first voltage point on the divider, the first control winding being adapted to provide positive feedback M. M. F.'s to said reactor when current flows through said first path, the second control winding being adapted to supply negative feedback M. M. F.'s to said reactor when current flows through said second path.

14. Arc-welding apparatus comprising a source of power, a welding load circuit, a magnetic amplifier for controlling the power supplied from said source to said load circuit, said amplifier including a saturable core reactor whose impedance may be decreased or increased depending on the sense of control M. M. F.'s supplied thereto, and a feedback network comprising a voltage divider, means for deriving from the load circuit a voltage proportional to the voltage across the load, means for applying said derived voltage across said voltage divider, said voltage divider having first, second and third voltage points, the second having a potential higher than the first, and the third having a potential higher than the second, and first and second circuit paths having a common point, the first path comprising a first control winding on said reactor, a one-way electric valve, and a source of bucking voltage for opposing current flow through said valve, the second path comprising a second control winding on said reactor and a one-way electric valve, said valves being poled in the same direction with respect to said common point, the first path being connected to the third voltage point on the divider and the second path being connected to the second voltage point on the divider, and means including an impedance for connecting said common point to said first voltage point on the divider, the first control winding being adapted to provide positive feedback to said reactor when current flows through said first path, the second control winding being adapted to supply negative feedback to said reactor when current flows through said second path.

15. A control system for a reactor circuit having a reactor with a saturable core, said system comprising: means connectable to a source of variable signals for obtaining first, second and third potential points from a variable signal, the points being of progressively higher potential in the order named and having potential differences respectively between the first and second points, between the second and third points, and between the first and third points; a first branch connected to said first and third points; and a second branch connected to said first and second points; one of said branches comprising a one-way electric valve, means for applying a control M. M. F. of one sense to said reactor when current flows in the valve direction through said one branch, and means for inserting therein a bias voltage to block current flow in the valve direction below a predetermined potential applied across the branch; the other branch comprising means for applying control M. M. F.'s in the opposite sense to said reactor when current flows in said other branch.

16. In a reactor system employing a saturable-core reactor having control windings and whose output may be driven up or down depending on the sense of control M. M. F.'s applied to the reactor core, the combination therewith of a control network connectable to a source of variable signals comprising first and second parallel branches, one branch comprising a one-way electric valve, means for supplying control M. M. F.'s of one sense to said reactor in response to current through that branch, and means for inserting a bias voltage in that branch, the other branch comprising a second one-way electric valve and means for supplying control M. M. F.'s of the opposite sense to said reactor in response to current through that branch, said branches having a common junction, said one-way valves being poled in the same direction with respect to said junction, and means for supplying different proportions of a variable voltage signal to the respective branches, said bias voltage being opposed to the signal voltage portion applied to said one branch, said branches being operable in response to said variable signal voltage to allow current flow in only said other branch below a predetermined signal value, and to allow current flow in said one branch above said predetermined value.

References Cited in the file of this patent

UNITED STATES PATENTS 2,267,395  Chambers _____ Dec. 23, 1941